Feb. 15, 1927.
M. BISHOP
LOCKING DEVICE
Filed March 18, 1925
1,617,985
2 Sheets-Sheet 1
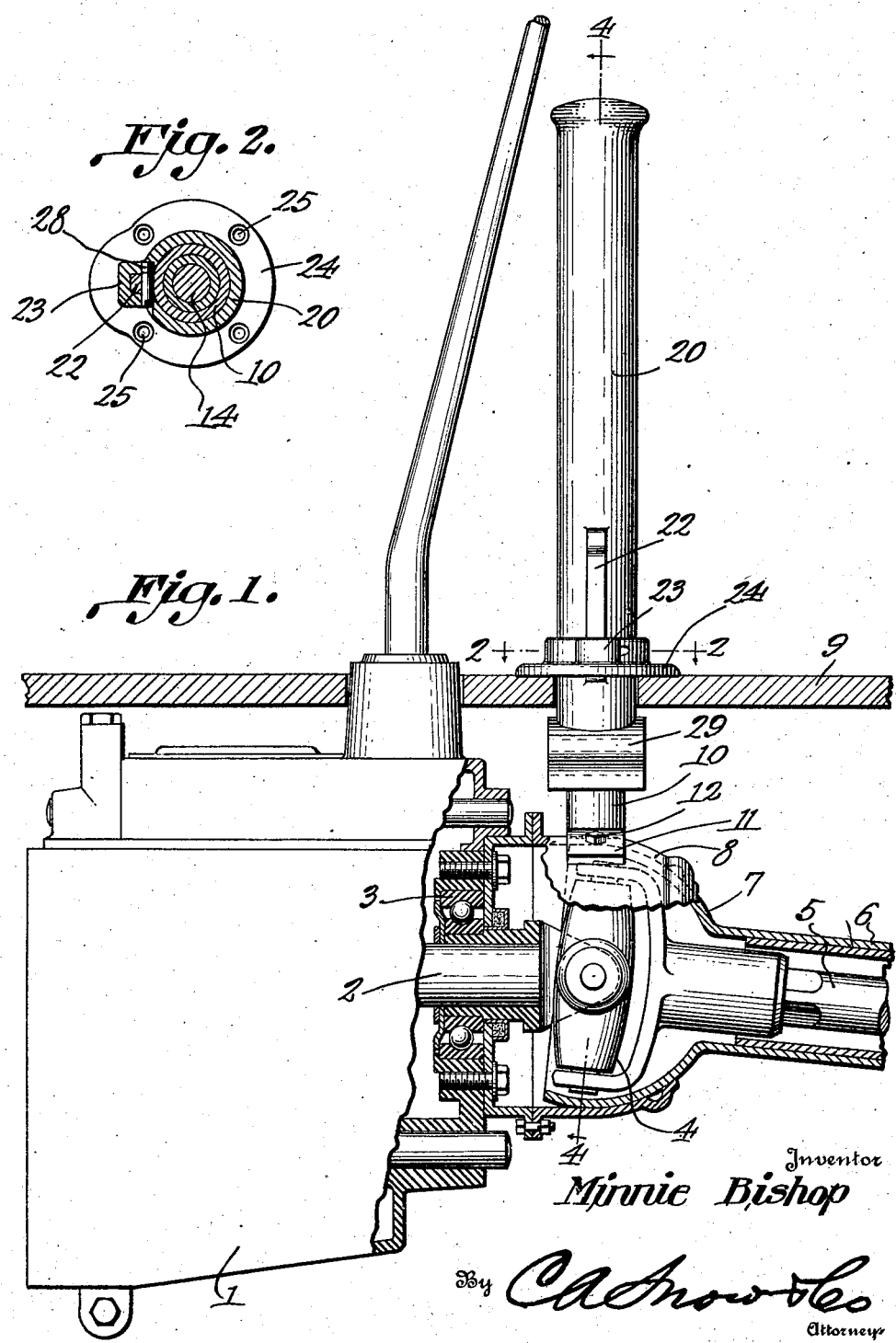
Inventor
Minnie Bishop Feb. 15, 1927. 1,617,985
M. BISHOP
LOCKING DEVICE
Filed March 18, 1925 2 Sheets-Sheet 2
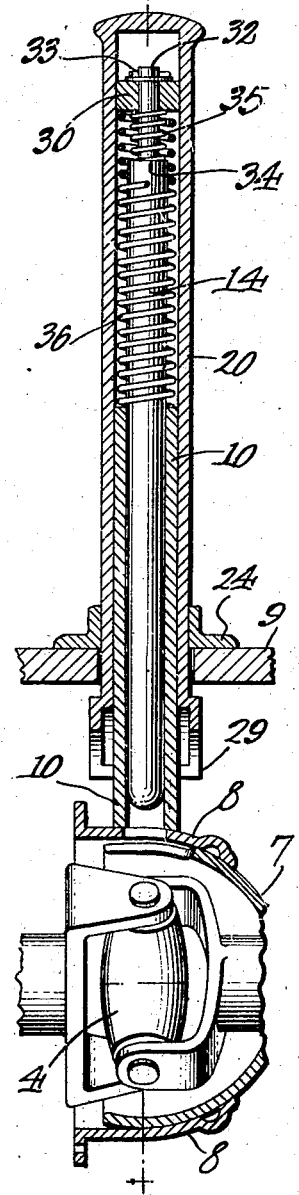
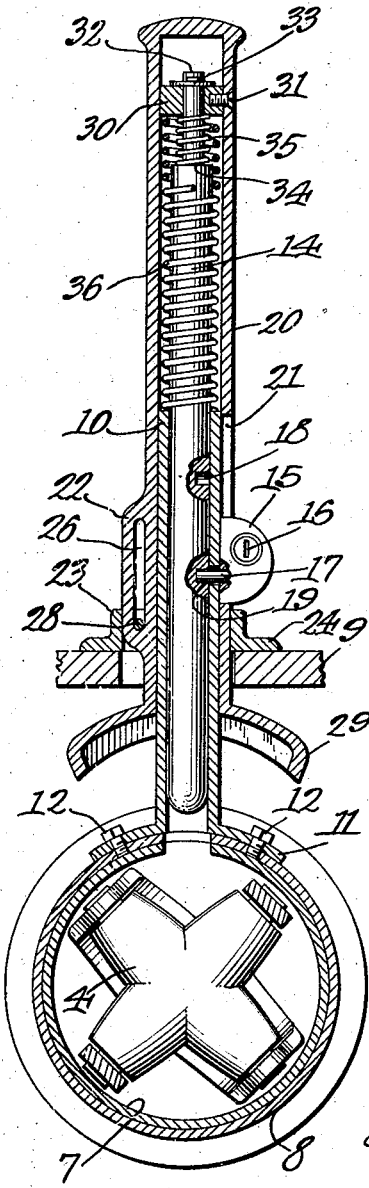
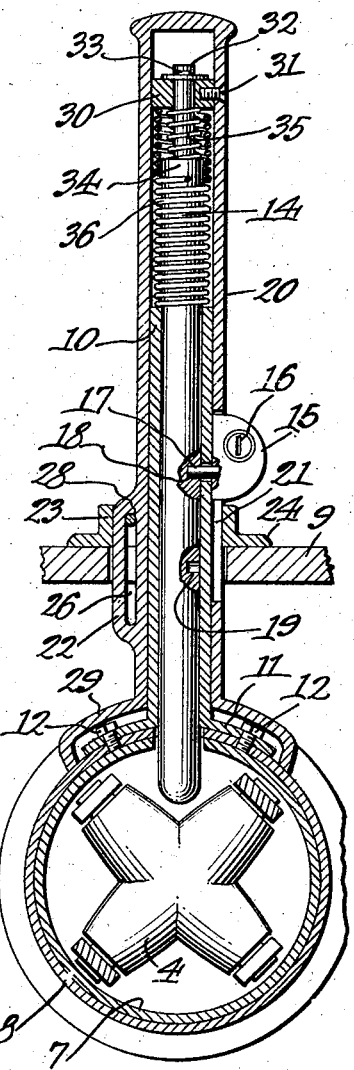
Inventor
Minnie Bishop
By C.A.Snow &Co
Attorneys Patented Feb. 15, 1927.

1,617,985

UNITED STATES PATENT OFFICE.

MINNIE BISHOP, OF ARCADIA, FLORIDA.

LOCKING DEVICE.

Application filed March 18, 1925. Serial No. 16,456.

This invention aims to provide a novel but simple locking device whereby the unauthorized operation of a motor propelled vehicle may be prevented.

It is within the province of the disclosure to improve generally and to enhance the utility of devices of that type to which the invention appertains.

With the above and other objects in view which will appear as the description proceeds, the invention resides in the combination and arrangement of parts and in the details of construction hereinafter described and claimed, it being understood that changes in the precise embodiment of the invention herein disclosed, may be made within the scope of what is claimed without departing from the spirit of the invention.

In the accompanying drawings:—

Figure 1 shows in elevation, a device constructed in accordance with the invention parts being broken away, and parts appearing in section; Figure 2 is a section on the line 2—2 of Figure 1; Figure 3 is a longitudinal section; Figure 4 is a longitudinal section on the line 4—4 of Figures 3 and 1, the parts being in the positions which they will assume when the device is unlocked; Figure 5 is a section similar to Figure 4 but showing the parts as they will appear when they are in locked position.

The device forming the subject matter of this application may be mounted in any desired way on the vehicle, and may be used on automobiles of widely different sorts. By way of illustration, however, there appears in Figure 1, a transmission housing 1, the drive shaft 2 of the transmission being supported for rotation, as indicated at 3, in the housing 1. By means of a universal joint 4 of any desired construction, the shaft 2 is connected to a driven shaft 5 rotatable in a tubular casing 6 provided at its forward end with a cup-like shell 7 movable within a similar shell 8, the shell 8 being fixedly attached to the transmission housing 1, or being supported in any other desired way. The floor boards, or any other accessible part of the frame work of the vehicle, are designated by the numeral 9. No novelty is claimed for the parts hereinbefore alluded to, saving in so far as they may enter into combination with parts hereinafter specified.

In carrying out the invention there is provided a tubular guide 10 which, perhaps, may extend upwardly through the floor boards 9. The guide 10 is supplied at its lower end with a foot 11 connected by securing elements 12 with the shell 8, that shell being designated as a support, since it carries the guide 10 and other parts of the device. A holding member 14, in the form of a bolt, is mounted for right line reciprocation in the guide 10. A lock 15 is secured to the guide 10 and projects laterally therefrom, the lock being adapted to be operated by a key, as indicated at 16, although this detail is not insisted upon. The lock 15 operates a bolt 17 adapted to cooperate with seats 18 and 19 formed in the holding member or bolt 14, and spaced apart, longitudinally of the holding member.

A tubular plunger 20 is mounted for reciprocation on the tubular guide 10 and has a slot 21, receiving the lock 15, and permitting the plunger 20 to be reciprocated with respect to the lock. It is preferable to mount the lock 15 on the guide 10 rather than on some other part of the device, because, when the lock is mounted as specified, the bolt 17 can have a comparatively short throw and still engage in the seats 18 and 19 of the holding member 14. The tubular plunger 20 is supplied with a lateral fin 22 mounted to slide in an offset 23 on a collar plate 24 secured at 25 to the floor boards 9, or elsewhere, the construction being such that, although the tubular plunger 20 can move endwise, it cannot rotate. The fin 22 has a longitudinal slot 26 through which extends a securing element 28, such as a screw, mounted in the offset 23 of the collar plate 24. On the lower end of the tubular plunger 20 there is a cap 29.

An abutment disk 30 is disposed in the tubular plunger 20, near to the upper, closed end thereof, the disk being held in place by a securing device 31. The plunger 30 is equipped at its upper end with a reduced stem 32, passing slidably through the abutment disk 30. On the outer end of the stem 32 of the plunger 20 is a cotter pin and washer 33. The stem 32 forms a shoulder 34 in the bolt 14. A compression spring 35 surrounds the stem 32, one end of the spring 35 abutting against the member 30, and the other end of the spring abutting against the shoulder 34. The holding bolt 14 is surrounded throughout a portion of its length by a compression spring 36, the inner end of the compression spring 36 abutting against the outer end of the guide 10, and the outer end of the spring 36 engaging the abutment 30.

When the device is in the unlocked position shown in Figure 4, the spring 36 has retracted the bolt 14 out of engagement with the universal joint 4, the securing element 28 stopping the outward movement of the plunger 20, the bolt 17 of the lock 15 being engaged in the seat 19 of the holding member 14. Upon occasion, the bolt 17 may be withdrawn from engagement in the seat 19 of the member 14, whereupon the plunger 20 may be forced inwardly and downwardly, the spring 36 being compressed, and the bolt 14 being carried downwardly until it is in such a position with respect to the universal joint 4 that the shafts 2 and 5 cannot rotate. When the plunger 20 is moved downwardly, the cap 29 on the plunger covers the securing elements 12 and the same cannot be removed. It is impossible, therefore, to detach the locking mechanism from the universal joint housing 7—8 when the device is in locked position. When the mechanism is in locked position, the bolt 17 may be engaged in the seat 18 on the holding member 14, to maintain that member in the position delineated in Figure 5 of the drawings. When the parts are in the locked position shown in Figure 5, the spring 35 permits a little vertical movement of the holding bolt 14, before the bolt 17 is engaged in the seat 18. As soon as the bolt 17 is retracted, the spring 36 carries the plunger 20 upwardly into the unlocked position of Figure 4, the holding member or bolt 14 also being moved into the unlocked position of that figure.

Having thus described the invention, what is claimed is:—

1. In a motor-propelled vehicle, a transmission, a drive shaft operated thereby, a universal joint interposed in the drive shaft, mechanism for engaging directly with the universal joint thereby to hold the shaft against rotation, and means under the control of an operator for locking said mechanism in engagement directly with the universal joint.

2. In a motor-propelled vehicle, a transmission, a drive shaft operated thereby, a universal joint interposed in the drive shaft, a shell covering the universal joint, a guide mounted on the shell of the universal joint, means mounted movably in the guide for engaging directly with the universal joint thereby to hold the shaft against rotation, and mechanism for locking said means in engagement with the universal joint.

3. In a motor-propelled vehicle, a transmission, a drive shaft operated thereby, a universal joint interposed in the drive shaft, a shell covering the universal joint, a tubular guide, a securing element connecting the guide with the shell, a bolt slidable in the guide, into and out of engagement with the universal joint, a lock carried by the guide and cooperating with the bolt, a tubular plunger mounted for reciprocation on the guide, the plunger being provided with an opening receiving the lock and permitting the plunger to reciprocate with respect to the guide, means for limiting the reciprocatory movement of the plunger on the guide, a cap on the lower end of the plunger and covering the securing element when the plunger is slid downwardly, an abutment in the plunger, the bolt having a reduced end slidable in the abutment and provided with a shoulder, a compression spring about the reduced end of the bolt and engaging the abutment and the shoulder, and a second compression spring about the bolt, one end of the second compression spring engaging the end of the guide, and the other end of the second compression spring engaging the abutment.

In testimony that I claim the foregoing as my own, I have hereto affixed my signature.

MINNIE BISHOP.